United States Patent
Kamikawa et al.

(10) Patent No.: US 8,153,754 B2
(45) Date of Patent: Apr. 10, 2012

(54) EQUIPMENT AND METHOD FOR PRODUCING POLYHYDROXYCARBOXYLIC ACID

(75) Inventors: Masayuki Kamikawa, Hitachinaka (JP); Toshiaki Matsuo, Mito (JP); Naruyasu Okamoto, Tokyo (JP); Kenichiro Oka, Mito (JP); Takeyuki Kondo, Hitachi (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 341 days.

(21) Appl. No.: 12/544,477

(22) Filed: Aug. 20, 2009

(65) Prior Publication Data

US 2010/0076165 A1 Mar. 25, 2010

(30) Foreign Application Priority Data

Sep. 22, 2008 (JP) ................. 2008-242235

(51) Int. Cl.
*C08G 63/08* (2006.01)
*B01D 53/00* (2006.01)
*B01J 19/18* (2006.01)

(52) U.S. Cl. .......... 528/354; 528/359; 528/501; 526/68; 422/134; 95/290; 96/201

(58) Field of Classification Search ................. 528/354, 528/501, 359; 95/290; 96/201; 422/134; 526/68
See application file for complete search history.

(56) References Cited

U.S. PATENT DOCUMENTS

| | | | |
|---|---|---|---|
| 5,338,822 A | 8/1994 | Gruber et al. | |
| 2005/0239999 A1* | 10/2005 | Okubo et al. | 528/272 |

FOREIGN PATENT DOCUMENTS

| | | |
|---|---|---|
| JP | 09-309948 | 12/1997 |
| JP | 10-017653 | 1/1998 |
| JP | 3258324 | 12/2001 |
| JP | 3258662 | 12/2001 |
| WO | WO 93/15127 | 8/1993 |
| WO | WO 94/07949 | 4/1994 |

OTHER PUBLICATIONS

EP Search of Application No. 09010669. dated Apr. 22, 2010 in English.
JP Search Report of Appln. No. 2008-242235 dated Jan. 18, 2011.

* cited by examiner

*Primary Examiner* — Fred M Teskin
(74) *Attorney, Agent, or Firm* — Antonelli, Terry, Stout & Kraus, LLP.

(57) ABSTRACT

An equipment for producing polyhydroxycarboxylic acid, includes a ring-opening polymerization apparatus, a liquid phase devolatilizing apparatus, and a drying apparatus, wherein an indirect heat exchanger is connected to a vent gas discharge path of the liquid phase devolatilizing apparatus. The indirect heat exchanger captures a dispersed in-process substance containing hydroxycarboxylic acid cyclic dimers and transfers the substance to the ring-opening polymerization apparatus; a wet condenser and a hot well are connected to a vent gas discharge path of the indirect heat exchanger and that of the drying apparatus, respectively. The wet condenser captures a dispersed in process substance containing the cyclic dimers with the use of a refrigerant containing hydroxycarboxylic acid corresponding to the cyclic dimers and transfers the substance to the hot well; the hot well causes hydrolysis of the cyclic dimers for generation of hydroxycarboxylic acid; the generated hydroxycarboxylic acid is mixed with a refrigerant and the mixture is circulated to the wet condenser; and hydroxycarboxylic acid is highly concentrated via circulation between the wet condenser and the hot well and then discharged.

18 Claims, 5 Drawing Sheets

EQUIPMENT AND METHOD FOR PRODUCING POLYHYDROXYCARBOXYLIC ACID

BACKGROUND OF THE INVENTION

1. Field of the Invention

The present invention relates to an equipment and a method for producing polyhydroxycarboxylic acid.

2. Background Art

Polyhydroxycarboxylic acid is an aliphatic polyester produced by polymerizing hydroxycarboxylic acid. A typical example thereof is polylactide.

Examples of known methods for synthesizing polylactide include methods disclosed in JP Patent No. 3258324 B and JP Patent No. 3258662 B. In these methods, lactic acid is concentrated such that the water contained therein is reduced, followed by condensation. Accordingly, lactic acid oligomers are generated. Such oligomers are temporally depolymerized with the addition of a catalyst such as tin 2-ethylhexanoate for generation of cyclic dimers (lactides). If necessary, purification is carried out via distillation, crystallization, or the like. Thereafter, ring-opening polymerization is caused with the addition of a catalyst such as tin 2-ethylhexanoate to lactides.

In some cases, the content of water regarded as an impurity in lactic acid is approximately 10% to 15%. Therefore, in order to facilitate the initiation of esterification between lactic acid molecules, water removal is carried out in the concentration step. In this concentration step, such water is removed by heating at 120° C. to 250° C. and, if necessary, depressurization using a vacuum pump or the like.

In the condensation step, water generated in reaction of esterification between lactic acid molecules is removed by vaporization caused by heating at 120° C. to 250° C. in a depressurization environment created with the use of a vacuum pump or the like and desirably in a depressurization environment at 10 Torr or less. As a result of the condensation step, lactic acid oligomers are generated from lactic acid.

Oligomers generated in the condensation step are subjected to a depolymerization step in which oligomers come into contact with a depolymerization catalyst such as tin 2-ethylhexanoate under heating at 120° C. to 250° C. in a depressurization environment created with the use of a vacuum pump or the like and desirably in a depressurization environment at 100 Torr or less. This results in generation of lactides (cyclic ester dimers of lactic acid). In general, the generated lactides are often in a form of a gas in the environment in the depolymerization step and can be recovered via cooling/condensation. The thus recovered lactides are separated from water, unreacted oligomers, and the like are purified via distillation or crystallization.

The purified lactides are subjected to a ring-opening polymerization step and allowed to come into contact with a ring-opening polymerization catalyst such as tin 2-ethylhexanoate and a polymerization initiator such as 1-dodecanol under heating at 120° C. to 250° C., resulting in generation of polylactide. Polylactide generated in the ring-opening polymerization step contains unreacted lactides and the catalyst. Unreacted lactides remaining in polylactide might cause deterioration in properties of polylactide and promotion of polylactide decomposition, which is problematic. Therefore, it is necessary to remove unreacted lactides. For such reason, unreacted lactides are evaporated from the surface of polylactide in a melted state by vacuum degassing treatment with the use of an agitator (this treatment is referred to as "liquid phase devolatilizing"). The thus evaporate unreacted lactides are cooled so as to be recovered.

Thereafter, polylactide in a melted state is cooled with a refrigerant such as water and formed into a desired shape such as a particle or pellet shape with a forming machine. Then, drying is carried out using hot air or the like. In many cases, drying is carried out at a temperature lower than the ring-opening polymerization reaction temperature.

As described in JP Patent No. 3258324 B and JP Patent No. 3258662 B, a dispersed in-process substance containing lactic acid and lactic acid condensates such as oligomer and lactide, which has been dispersed into the discharged vent gas during the process, is cooled and recovered using a heat exchanger or the like in the depolymerization step, the ring-opening polymerization step, the liquid phase devolatilizing step, and the drying step. However, it has been conventionally difficult to reuse such recovered substance and therefore such substance has been discarded. This has been the cause for reduction in yield. Regarding such problem, the method disclosed in JP Patent Publication (Kokai) No. 10-17653 A (1998) has been known, wherein a dispersed in-process substance is recovered using a barometric condenser that carries out direct cooling via water dispersion so as to be reused as a starting material.

SUMMARY OF THE INVENTION

According to the method disclosed in JP Patent Publication (Kokai) No. 10-17653 A (1998), a dispersed in-process substance that has been recovered is hydrolyzed into lactic acid that can be reused as a starting material. However, a solution obtained by washing out the dispersed in-process substance has a large percentage of water content compared with lactic acid serving as a starting material. Therefore, the reuse of such solution as a starting material causes increases in operating time and operating cost necessary for water evaporation, which is problematic.

The present invention has been made in view of the above problems. It is an object of the present invention to efficiently recover a dispersed in-process substance in the vent gas discharged during the process of production of polyhydroxycarboxylic acid such as polylactide and to reuse the substance as a starting material so as to improve the product yield in the process.

In order to achieve the above object, the present inventors have invented a novel equipment and a method for producing polyhydroxycarboxylic acid. The present invention is summarized below.

(1) An equipment for producing polyhydroxycarboxylic acid, comprising a ring-opening polymerization apparatus for causing ring-opening polymerization of hydroxycarboxylic acid cyclic dimers, a liquid phase devolatilizing apparatus for devolatilizing of unreacted cyclic dimers or by-products with application of negative pressure while maintaining the generated polyhydroxycarboxylic acid in a melted state, and a drying apparatus for heating solidified polyhydroxycarboxylic acid for drying, wherein an indirect heat exchanger is connected to the vent gas discharge path of the liquid phase devolatilizing apparatus, the indirect heat exchanger captures a dispersed in-process substance containing the cyclic dimers and transfers the substance to the ring-opening polymerization apparatus, a wet condenser and a hot well are connected to the vent gas discharge path of the indirect heat exchanger and that of the drying apparatus, respectively, the wet condenser captures a dispersed in-process substance containing the cyclic dimers with the use of a refrigerant containing hydroxycarboxylic acid (corresponding to the cyclic dimers) at a concentration of 50% or more and transfers the substance to the hot well, the hot well causes hydrolysis of the cyclic dimers for generation of hydroxycarboxylic acid, the generated hydroxycarboxylic acid is mixed with the refrigerant and the mixture is circulated to the wet condenser, and hydroxycarboxylic acid is highly concentrated via circulation between the wet condenser and the hot well and then discharged.

(2) The equipment for producing polyhydroxycarboxylic acid according to (1), wherein an indirect heat exchanger is connected to the vent gas discharge path of the ring-opening polymerization apparatus and a wet condenser and a hot well are connected to the vent gas discharge path of the indirect heat exchanger.

(3) The equipment for producing polyhydroxycarboxylic acid according to (1) or (2), further comprising a condensation apparatus for oligomerizing hydroxycarboxylic acid and a depolymerization apparatus for depolymerizing oligomers to generate hydroxycarboxylic acid cyclic dimers, in upstream of the ring-opening polymerization apparatus, wherein highly concentrated hydroxycarboxylic acid obtained as the result of circulation between the wet condenser and the hot well is transferred to the condensation apparatus so as to be used as a starting material.

(4) The equipment for producing polyhydroxycarboxylic acid according to (3), wherein a wet condenser and a hot well are connected to the vent gas discharge path of the depolymerization apparatus.

(5) The equipment for producing polyhydroxycarboxylic acid according to any one of (1) to (4), further comprising a forming apparatus between the liquid phase devolatilizing apparatus and the drying apparatus for allowing polyhydroxycarboxylic acid to be water-cooled and then formed into a pellet shape.

(6) The equipment for producing polyhydroxycarboxylic acid according to any one of (1) to (5), further comprising a purification apparatus between the indirect heat exchanger and the ring-opening polymerization apparatus, wherein the purification apparatus purifies hydroxycarboxylic acid cyclic dimers from the dispersed in-process substance and transfers the resultant to the ring-opening polymerization apparatus.

(7) The equipment for producing polyhydroxycarboxylic acid according to any one of (1) to (6), wherein the dispersed in-process substance further contains hydroxycarboxylic acid oligomers and the hot well causes hydrolysis of the oligomers.

(8) A method for producing polyhydroxycarboxylic acid comprising the steps of: ring-opening polymerization of hydroxycarboxylic acid cyclic dimers, liquid phase devolatilizing for devolatilizing of unreacted cyclic dimers or by-products with application of negative pressure while maintaining the generated polyhydroxycarboxylic acid in a melted state, and drying by heating solidified polyhydroxycarboxylic acid for drying, wherein:

a dispersed in-process substance containing the cyclic dimers is captured from a vent gas discharged in the liquid phase devolatilizing step with the use of an indirect heat exchanger such that the substance is used as a starting material in the ring-opening polymerization step, while the dispersed in-process substance containing the cyclic dimers is also captured from a vent gas discharged from the indirect heat exchanger and a vent gas discharged in the drying step with the use of a solution containing hydroxycarboxylic acid (corresponding to the cyclic dimers) at a concentration of 50% or more, the dispersed in-process substance captured with the use of the solution is hydrolyzed for generation of hydroxycarboxylic acid, the generated hydroxycarboxylic acid is mixed with the solution and the mixture is circulated, and highly concentrated hydroxycarboxylic acid obtained by circulating the solution is discharged.

(9) The method for producing polyhydroxycarboxylic acid according to (8), wherein the dispersed in-process substance containing the cyclic dimers is captured from a vent gas discharged in the ring-opening polymerization step with the use of the indirect heat exchanger so as to be used as a starting material in the ring-opening polymerization step, during which the dispersed in-process substance containing the cyclic dimers is also captured from a vent gas discharged from the indirect heat exchanger with the use of the solution, the dispersed in-process substance captured with the use of the solution is hydrolyzed for generation of hydroxycarboxylic acid, the generated hydroxycarboxylic acid is mixed with the solution and the mixture is circulated, and highly concentrated hydroxycarboxylic acid obtained by circulating the solution is discharged.

(10) The method for producing polyhydroxycarboxylic acid according to (8) or (9), further comprising condensation step of oligomerizing hydroxycarboxylic acid and oligomer depolymerization step of generating hydroxycarboxylic acid cyclic dimers prior to the ring-opening polymerization step, wherein the discharged highly concentrated hydroxycarboxylic acid is used as a starting material in the condensation step.

(11) The method for producing polyhydroxycarboxylic acid according to (10), wherein the dispersed in-process substance containing the cyclic dimers is captured from a vent gas discharged in the depolymerization step with the use of the solution, the dispersed in-process substance captured with the use of the solution is hydrolyzed for generation of hydroxycarboxylic acid, the generated hydroxycarboxylic acid is mixed with the solution and the mixture is circulated, highly concentrated hydroxycarboxylic acid obtained by circulating the solution is discharged, and the discharged highly concentrated hydroxycarboxylic acid is used as a starting material in the condensation step.

(12) The method for producing polyhydroxycarboxylic acid according to any one of (8) to (11), further comprising a forming step of allowing polyhydroxycarboxylic acid to be water-cooled and then subjected to forming, between the liquid phase devolatilizing step and the step of drying solidified polyhydroxycarboxylic acid by heating.

(13) The method for producing polyhydroxycarboxylic acid according to any one of (8) to (12), wherein the dispersed in-process substance containing the cyclic dimers is captured with the use of the indirect heat exchanger, the cyclic dimers are purified, and the resultant is used as a starting material in the ring-opening polymerization step.

(14) The method for producing polyhydroxycarboxylic acid according to any one of (8) to (13), wherein the dispersed in-process substance further contains hydroxycarboxylic acid oligomers, and the oligomers are captured with the use of the solution and hydrolyzed for generation of hydroxycarboxylic acid.

(15) The equipment for producing polyhydroxycarboxylic acid according to any one of (1) to (5), further comprising a purification apparatus between the depolymerization apparatus and the ring-opening polymerization apparatus, wherein the purification apparatus purifies hydroxycarboxylic acid cyclic dimers from those produced at depolymerization apparatus and transfers the resultant to the ring-opening polymerization apparatus.

According to the equipment and the method for producing polyhydroxycarboxylic acid of the present invention, it becomes possible to efficiently recover a dispersed in-process substance generated during the process of production of polyhydroxycarboxylic acid and reuse the substance as a starting material so as to improve the yield of a starting material in the process.

This specification incorporates the content of the specification of Japanese Patent Application No. 2008-242235, for which priority is claimed to the present application.

EXPLANATION OF REFERENCE NUMERALS

1: Lactic acid feeding apparatus; 3: Lactic acid concentration apparatus; 7: Lactic acid condensation apparatus; 11: Depolymerization apparatus; 12. Refluxer; 13: Lactide cooler; 15: Purification apparatus; 17: Ring-opening polymerization apparatus; 18: Ring-opening polymerization apparatus; 19: Liquid phase devolatilizing apparatus; 20: Forming apparatus; 21: Drying apparatus; 22: Wet condenser; 25: Wet condenser; 26: Wet condenser; 28: Wet condenser; 30: Buffer tank; 31: Hot well; 33: Cooler; 35: Hot well; 37: Cooler; 40: Hot well; 42: Cooler; 45: Hot well; 47: Cooler; 50: Indirect heat exchanger; 51: Hot well; 53: Indirect heat exchanger; 54: Hot well; 123: Wet condenser body; 124: Gas inlet pipe; 125: Non-condensable gas discharge pipe; 126: Lactic acid feed pipe; 127: Condensed solution discharge pipe; 128: Lactic acid feed nozzle; 129: Tray, 130. Lactic acid shower nozzle

DESCRIPTION OF THE PREFERRED EMBODIMENTS

The present invention is hereafter described in greater detail with reference to the following examples, although the technical scope of the present invention is not limited thereto.

Figure 1:
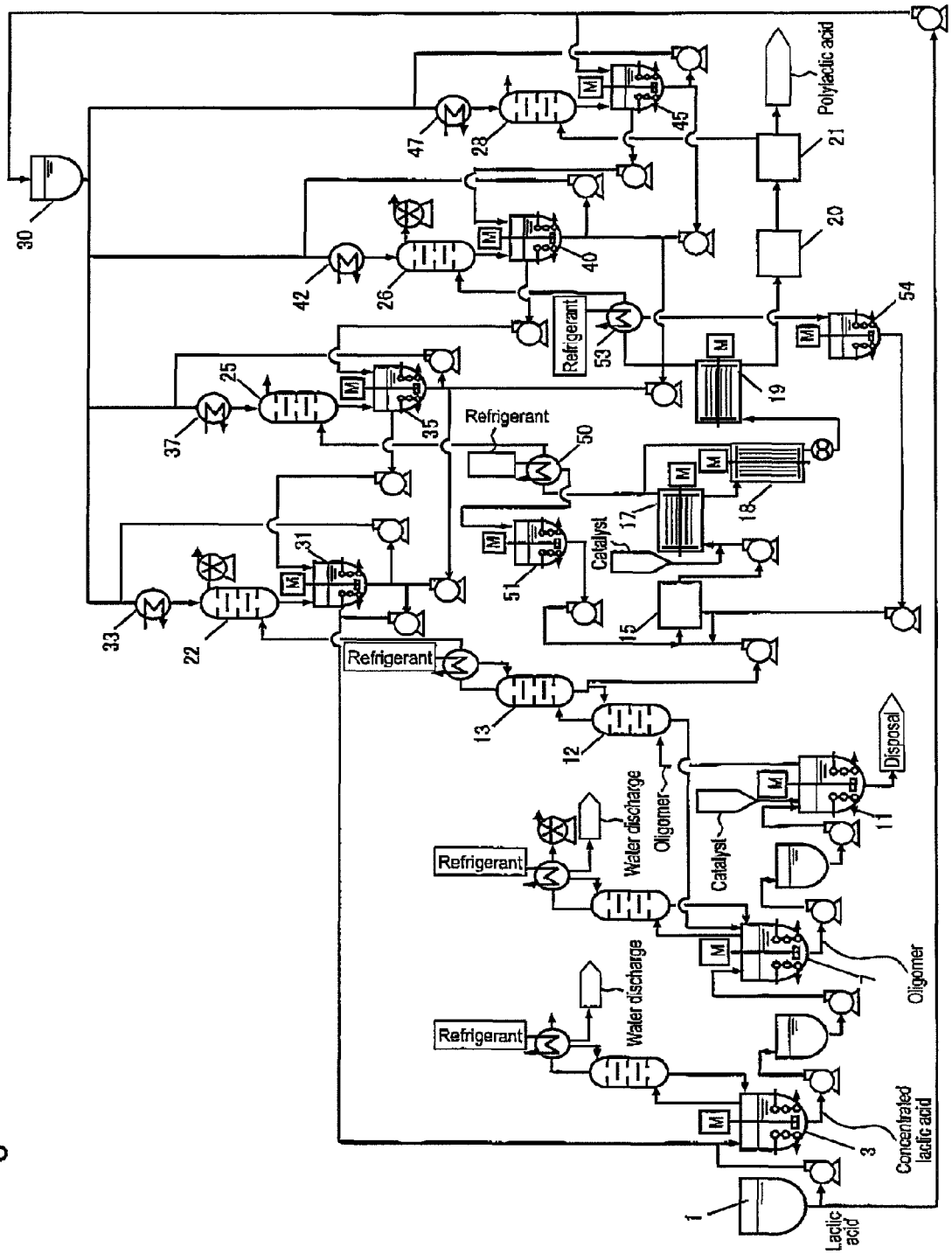
FIG. 1 shows an example of the equipment for producing polyhydroxycarboxylic acid of the present invention.

FIG. 1 shows an example of the equipment for producing polyhydroxycarboxylic acid of the present invention. Herein, production of polylactide with the use of the equipment is described for convenience. However, this equipment can be used not only for polylactide production but also for production of other hydroxycarboxylic acid polymers. In a case in which hydroxycarboxylic acid polymers other than lactic acid polymers are produced, the terms "lactide," "lactic acid oligomer," and "lactic acid" used in the descriptions below can be replaced by "hydroxycarboxylic acid cyclic dimer," "hydroxycarboxylic acid oligomer," and "hydroxycarboxylic acid," respectively. Examples of other hydroxycarboxylic acids include glycolic acid, 3-hydroxybutyric acid, 4-hydroxybutyric acid, 4-hydroxyvaleric acid, 5-hydroxyvaleric acid, and 6-hydroxycaproic acid.

The method for producing polyhydroxycarboxylic acid of the present invention can be carried out using an equipment as shown in FIG. 1. However, the method is not limited to the use of such equipment. Therefore, the method can be carried out using different equipments without departing from the scope of the present invention.

The equipment of the present invention mainly comprises a lactic acid feeding apparatus 1, a lactic acid concentration apparatus 3, a lactic acid condensation apparatus 7, a depolymerization apparatus 11, ring-opening polymerization apparatuses 17 and 18, a liquid phase devolatilizing apparatus 19, a forming apparatus 20, and a drying apparatus 21.

In the lactic acid concentration apparatus 3, the water contained in lactic acid supplied by the lactic acid feeding apparatus 1 is evaporated by heating. Heating is preferably carried out within a flow of nitrogen gas at 120° C. to 150° C. As a result of a lactic acid concentration reaction, a gas containing lactic acid and water is generated. Preferably, the lactic acid concentration apparatus 3 comprises a refluxer that captures lactic acid from the gas and refluxes the captured lactic acid to the lactic acid concentration apparatus 3. Preferably, the water contained in lactic acid is removed as much as possible by heating and evaporating in the lactic acid concentration apparatus 3. The concentrated lactic acid produced in the lactic acid concentration apparatus 3 is transferred to the lactic acid condensation apparatus 7. In addition, if lactic acid used as a starting material is preliminarily concentrated, the lactic acid concentration apparatus 3 can be omitted.

In the lactic acid condensation apparatus 7, a lactic acid condensation reaction is allowed to proceed for lactic acid oligomer generation. Water generated during the reaction is evaporated. The conceptual term "lactic acid oligomer" used in the present invention refers to a lactic acid oligomer ranging from a lactic acid dimer to a lactic acid polymer having a molecular weight of approximately 50,000. The average molecular weight of lactic acid oligomers obtained as a result of the above lactic acid condensation reaction is generally 500 to 10,000 and preferably 1,000 to 5,000. The lactic acid condensation reaction is generally carried out at a pressure of 100 Torr or less, preferably 10 Torr or less, and more preferably 1 Torr or less, and generally at a temperature of 100° C. to 220° C. and preferably 130° C. to 200° C. It is preferable to minimize the heating time such that thermal decomposition of lactic acid and lactic acid oligomers can be inhibited.

During the lactic acid condensation reaction, if necessary, a catalyst for a lactic acid condensation reaction may be added. A conventionally known catalyst can be used as a catalyst for such reaction. Examples thereof include: organo-tin-based catalysts (e.g., tin lactate, tin tartrate, tin dicaprylate, tin dilaurate, tin dipalmitate, tin distearate, tin dioleate, tin α-naphthoate, tin β-naphthoate, and tin octylate); and powdered tin.

The lactic acid condensation apparatus 7 has at least a reactor, a concentrated lactic acid feeding opening, and a lactic acid oligomer discharging opening. The reactor can be either a vertical reactor or a horizontal reactor. As a method for heating a reactor, methods that are generally used in the art can be used. Examples of such methods include a method wherein a heat medium jacket is provided to the outer peripheral part of a reactor such that a reaction solution is heated by heat transfer through the reactor wall and a method wherein heating is carried out via heat transfer through heat transfer tubes (coils) that are provided inside the reactor. These methods may be used alone or in combination.

The lactic acid condensation reaction causes the generation of a gas containing water, lactic acid, low-molecular-weight lactic acid oligomers, and lactide that is generated due to decomposition of the oligomers. Preferably, the lactic acid condensation apparatus 7 comprises a refluxer. The refluxer captures lactic acid, low-molecular-weight lactic acid oligomers, and lactides from the gas and refluxes them to the lactic acid condensation apparatus 7. Lactic acid oligomers generated in the lactic acid condensation apparatus 7 are transferred to the depolymerization apparatus 11.

In the depolymerization apparatus 11, a depolymerization reaction of lactic acid oligomers is allowed to proceed for lactide generation. The depolymerization apparatus 11 comprises a depressurization unit. A depolymerization reaction of lactic acid oligomers is carried out in a depressurization environment generally at 100 Torr or less and preferably at 10 Torr or less by heating generally at 120° C. to 250° C. and preferably at 170° C. to 200° C. Accordingly, lactides are generated in the form of a gas. In the present invention, the term "lactide" indicates cyclic ester generated by a dehydration reaction for removing two water molecules from two lactic acid molecules.

The depolymerization apparatus 11 has at least a reactor, a lactic acid oligomer feeding opening, and a lactide discharging opening. In addition, a thermometer is usually provided thereto. The reactor is not particularly limited and can be a vertical reactor, a horizontal reactor, or a tank reactor. Examples of an agitating blade that can be used include paddle blades, turbine blades, anchor blades, double-motion blades, and helical ribbon blades. As a method for heating a reactor, methods that are generally used in the art can be used. Examples of such methods include a method wherein a heat medium jacket is provided to the outer peripheral part of a reactor such that a reaction solution is heated by heat transfer through the reactor wall and a method wherein heating is carried out via heat transfer through heat transfer tubes (coils) that are provided inside the reactor. These methods may be used alone or in combination.

For a depolymerization reaction, if necessary, a catalyst for a depolymerization reaction may be added. Conventionally known catalysts can be used. Examples thereof include catalysts comprising: metals selected from the group consisting of metals of Groups IA, IIIA, IVA, II, and VA of the periodic table; or metal compounds thereof.

Examples of catalysts comprising metals belonging to Group IA include hydroxides of alkali metals (e.g., sodium hydroxide, potassium hydroxide, and lithium hydroxide), salts of alkali metals and weak acids (e.g., sodium lactate, sodium acetate, sodium carbonate, sodium octylate, sodium stearate, potassium lactate, potassium acetate, potassium carbonate, and potassium octylate), alkoxides of alkali metals (e.g., sodium methoxide, potassium methoxide, sodium ethoxide, and potassium ethoxide).

Examples of catalysts comprising belonging to Group IIIA include aluminium ethoxide, aluminium isopropoxide, alumina, and aluminium chloride.

Examples of catalysts comprising belonging to Group IVA include organotin-based catalysts (e.g., tin lactate, tin tartrate, tin dicaprylate, tin distearate, tin dioleate, tin α-naphthoate, tin β-naphthoate, and tin octylate), powdered tin, oxidized tin, and halogenated tin.

Examples of catalysts comprising belonging to Group IIB include zinc powder, halogenated zinc, oxidized zinc, and organozinc-based compounds.

Examples of catalysts comprising belonging to Group IVB include titanium-based compounds such as tetrapropyl titanate and zirconium-based compounds such as zirconiumisopropoxide.

Among the above, it is preferable to use a tin-based compound such as tin octylate or an antimony-based compound such as antimony trioxide. In addition, the content of catalyst used is approximately 0.01% to 20% by weight, preferably approximately 0.05% to 15% by weight, and more preferably approximately 0.1% to 10% by weight based on the weight of lactic acid oligomers.

Vapor comprising lactides generated in the depolymerization apparatus 11 is discharged outside the depolymerization apparatus 11 and supplied to the lactide cooler 13. Then, lactide is recovered after cooling and condensation and then transferred to the purification apparatus 15.

A desired example of a lactide cooler 13 is a surface condenser in which vapor and a refrigerant indirectly come into contact with each other via metal tubes. This is because it is necessary to prevent acid generation due to lactide decomposition caused by direct contact between lactide and a water-containing refrigerant. As a result of acid generation, acid serves as a catalyst to inhibit the progress in a ring-opening polymerization reaction. In addition, acid may cause corrosion of materials of a cooler and the like. There are exceptional cases in which a refrigerant such as nitrogen gas that is inert in the presence of lactide is used. In such case, it is necessary to sufficiently dry a refrigerant to reduce the hygroscopic moisture therein.

The purification apparatus 15 is used for separating impurities such as water contained in lactides and unreacted oligomers with the use of a method involving distillation, crystallization, or the like. In the case of distillation, purification is carried out by heating lactides and cooling vapor in a stepwise manner so as to separate/recover high purity lactides. Then, lactides discharged from the purification apparatus 15 are transferred to the ring-opening polymerization apparatus 17.

In addition, the step of forming lactide via lactic acid oligomer generation and depolymerization is applied to the equipment shown in FIG. 1. However, instead of such step, a known step of forming lactides directly from lactic acid may be applied. In addition, when lactide is available as a starting material, the use of the condensation apparatus 7 and the depolymerization apparatus 11 can be omitted.

In the ring-opening polymerization apparatuses 17 and 18, polylactide is generated by allowing the ring-opening polymerization reaction of lactides to proceed. In the ring-opening polymerization apparatuses 17 and 18, a ring-opening polymerization reaction of lactides is carried out in an inert gas atmosphere by heating generally at 120° C. to 250° C. and preferably at 120° C. to 200° C.

The ring-opening polymerization apparatuses 17 and 18 each have at least a reactor, a lactide feeding opening, and a polylactide discharging opening. In addition, a thermometer is usually provided thereto. The reactor is not particularly limited and can be a vertical reactor, a horizontal reactor, or a tank reactor. As shown in FIG. 1, two or more reactors may be installed in series or a single reactor may be installed. Examples of an agitating blade that can be used include paddle blades, turbine blades, anchor blades, double-motion blades, and helical ribbon blades. As a method for heating a reactor, methods that are generally used in the art can be used. Examples of such methods include a method wherein a heat medium jacket is provided to the outer peripheral part of a reactor such that a reaction solution is heated by heat transfer through the reactor wall and a method wherein heating is carried out via heat transfer through heat transfer tubes (coils) provided inside the reactor. These methods may be used alone or in combinations.

For a ring-opening polymerization reaction, if necessary, a catalyst for a ring-opening polymerization reaction may be added. Conventionally known catalysts can be used. Examples thereof include catalysts comprising: metals selected from the group consisting of metals of Groups IA, IIIA, IV, IIB, and VA of the periodic table; and metal compounds thereof. Among the above, it is preferable to use a tin-base compound such as tin octylate or an antimony-base compound such as antimony trioxide. The content of catalyst used is approximately 1 to 2000 ppm, preferably approximately 5 to 1500 ppm, and more preferably approximately 10 to 1000 ppm based on the amount of lactides.

For a ring-opening polymerization reaction, if necessary, a polymerization initiator may be added for the purpose of, for example, adjusting the molecular weight. Examples of polymerization initiators that can be used include alcohols such as 1-dodecanol. For instance, when the concentration of a polymerization initiator is 700 ppm, the weight average molecular weight of polylactide is approximately 200000. Polylactide generated in the ring-opening polymerization apparatuses 17 and 18 is transferred to the liquid phase devolatilizing apparatus 19.

In the liquid phase devolatilizing apparatus 19, a negative pressure environment is created while maintaining polylactide in a melted state such that unreacted lactides and other by-products such as lactic acid oligomers, lactic acid, and water contained in polylactide are removed. (Hereinafter, this step is referred to as the "liquid phase devolatilizing" step.) In the liquid phase devolatilizing step, if necessary, an antioxidant may be added to polylactide.

A depressurization unit is installed to the liquid phase devolatilizing apparatus 19. In the apparatus, devolatilizing of polylactide is carried out by heating in a depressurization environment generally at 100 Torr or less and preferably at 1 Torr or less at a temperature of generally 120° C. to 250° C. and preferably 180° C. to 200° C., which is higher than that in the ring-opening polymerization apparatus.

The liquid phase devolatilizing apparatus 19 has at least a reactor, a polylactide feeding opening, and a polylactide discharging opening. In addition, a thermometer is generally provided thereto. The reactor used is not particularly limited and examples thereof include twin screw extruders, single screw extruders, four-axial extruders, and horizontal reactors. As a method for heating a reactor, methods that are generally used in the art can be used. Examples of such methods include a method wherein a heat medium jacket is provided to the outer peripheral part of a reactor such that a reaction solution is heated by heat transfer through the reactor wall and a method wherein heating is carried out via heat transfer through heat transfer tubes (coils) that are provided inside the reactor These methods may be used alone or in combinations. Polylactide subjected to liquid phase devolatilizing is transferred to the forming apparatus 20.

The forming apparatus 20 has at least a polylactide feeding opening and a polylactide discharging opening. In the forming apparatus 20, polylactide strands in a melted state are cooled by water cooling or the like and formed into a desired shape such as a particle or pellet shape. For example, a chip cutter can be used as such an apparatus. However, the present invention is not particularly limited thereto. Polylactide formed above is transferred to the drying apparatus 21.

In the drying apparatus 21, polylactide formed above is dried with the use of drying air or the like. Such an apparatus that can be used is, for example, a hot air dryer or an apparatus in which polylactide is placed on mesh and gas is allowed to pass upward therethrough; however, it is not limited thereto. Alternatively, it is possible to dry polylactide while transferring polylactide with the use of a conveyer belt or the like. A plurality of such apparatuses may be used. The drying temperature is 100° C. to 200° C. and preferably 120° C. to 180° C. The drying temperature may be changed in a continuous or step-wise manner. The drying time is 1 minute to 25 hours and preferably 5 minutes to 11 hours. In addition to dried air, dried nitrogen and the like can be used for drying. However, the present invention is not limited thereto.

An indirect heat exchanger 50 is connected to each of the vent gas discharge paths of the ring-opening polymerization apparatuses 17 and 18 and an indirect heat exchanger 53 is connected to the vent gas discharge path of the liquid phase devolatilizing apparatus 19 for introduction of discharged vent gas from each apparatus. In FIG. 1, an indirect heat exchanger is provided to each of the vent gas discharge paths of the ring-opening polymerization apparatuses 17 and 18 and the liquid phase devolatilizing apparatus 19. However, the present invention is not limited to such example. It is acceptable as long as an indirect heat exchanger is provided to at least the liquid phase devolatilizing apparatus 19.

The vent gas discharged from each apparatus contains a dispersed in-process substance comprising lactides, lactic acid oligomers, lactic acid, water, and the like. In the liquid phase devolatilizing step, a dispersed in-process substance has a low water content and a high lactide content. Therefore, lactides can be efficiently recovered by installation of an indirect heat exchanger. In particular, the liquid phase devolatilizing step is carried out in a depressurization environment and thus a large volume of lactides is dispersed. Accordingly, recovery of lactides in the liquid phase devolatilizing step significantly influences the improvement of the yield in the entire process. In addition, generally, polylactide composed of single isomer of L- or D-lactic acid is preferred. Therefore, it is important to maintain optical purity during polylactide production. However, lactides recovered herein by use of an indirect heat exchanger can be used for ring-opening polymerization immediately after being purified without being subjected to the concentration and condensation steps. Thus, it is possible to inhibit reduction in optical purity, which is advantageous. In addition, a dispersed in-process substance in the ring-opening polymerization step also has a low water content and a high lactide content and thus lactides can be efficiently recovered by installation of an indirect heat exchanger. This contributes to the improvement of the yield for the entire process.

Hot wells 51 and 54 are installed to the lower portions of indirect heat exchangers 50 and 53 such that lactides are refluxed from the hot wells to a purification apparatus. Hot wells 51 and 54 are provided for liquefaction of lactides. However, they can be omitted in some cases. In addition, examples of an indirect heat exchanger used herein include general products such as U-tube condensers and the like.

Wet condensers 22, 25, 26, and 28 are connected to the vent gas discharge paths of the depolymerization apparatus 11, the drying apparatus 21, and the indirect heat exchangers 50 and 53, respectively, for introduction of vent gas discharged from each apparatus or indirect heat exchanger. In the present invention, the term "wet condenser" refers to a condenser (condensing unit) in which a gas to be conducted and a refrigerant come into direct contact with each other. The vent gas discharged from the depolymerization apparatus 11 and the drying apparatus 21 contains a dispersed in-process substance comprising lactides, lactic acid oligomers, lactic acid, and water. In addition, the discharged vent gas from the indirect heat exchangers 50 and 53 contains a dispersed in-process substance comprising lactides, lactic acid oligomers, lactic acid, and water that could not be captured by an indirect heat exchanger. Such dispersed in-process substance contained in discharged vent gas is captured and transferred to a hot well described below by each wet condenser so as to be hydrolyzed to lactic acid. Then, lactic acid is transferred to the lactic acid concentration apparatus 3 and reused as a starting material. In the case of the equipment shown in FIG. 1, a wet condenser is provided to each of the vent gas discharge paths of the depolymerization apparatus 11, the drying apparatus 21, and the indirect heat exchangers 50 and 53. However, the present invention is not limited to such example It is acceptable as long as a wet condenser is installed to at least the indirect heat exchanger 53 provided along the vent gas discharge path of the liquid phase devolatilizing apparatus 19.

Lactic acid, which is a starting material for the process, is used as a refrigerant in each wet condenser. In each wet condenser, a dispersed in-process substance contained in discharged vent gas is captured and dissolved via circulation of lactic acid cooled in coolers 33, 37, 42, and 47. The temperature of cooled lactic acid is approximately 0° C. to 100° C. and preferably approximately 10° C. to 30° C. The initial concentration of lactic acid used as a refrigerant is 50% or more, preferably 75% or more, and particularly preferably 90% or more. When the lactic acid concentration is maintained at 98% or less and preferably 95% or less, the viscosity does not excessively increase, which is preferable.

Figure 2:
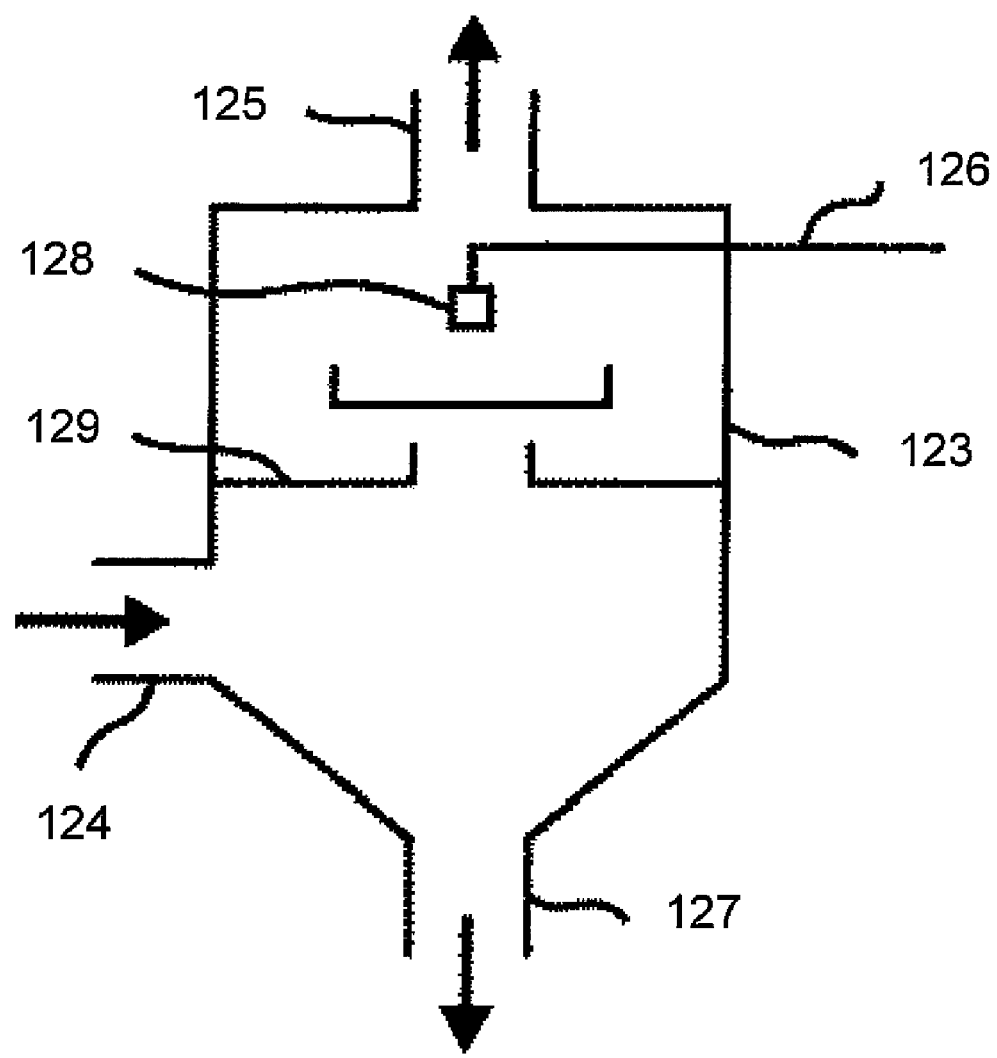
FIG. 2 shows a schematic diagram of a first configuration example of a wet condenser.
Figure 3:
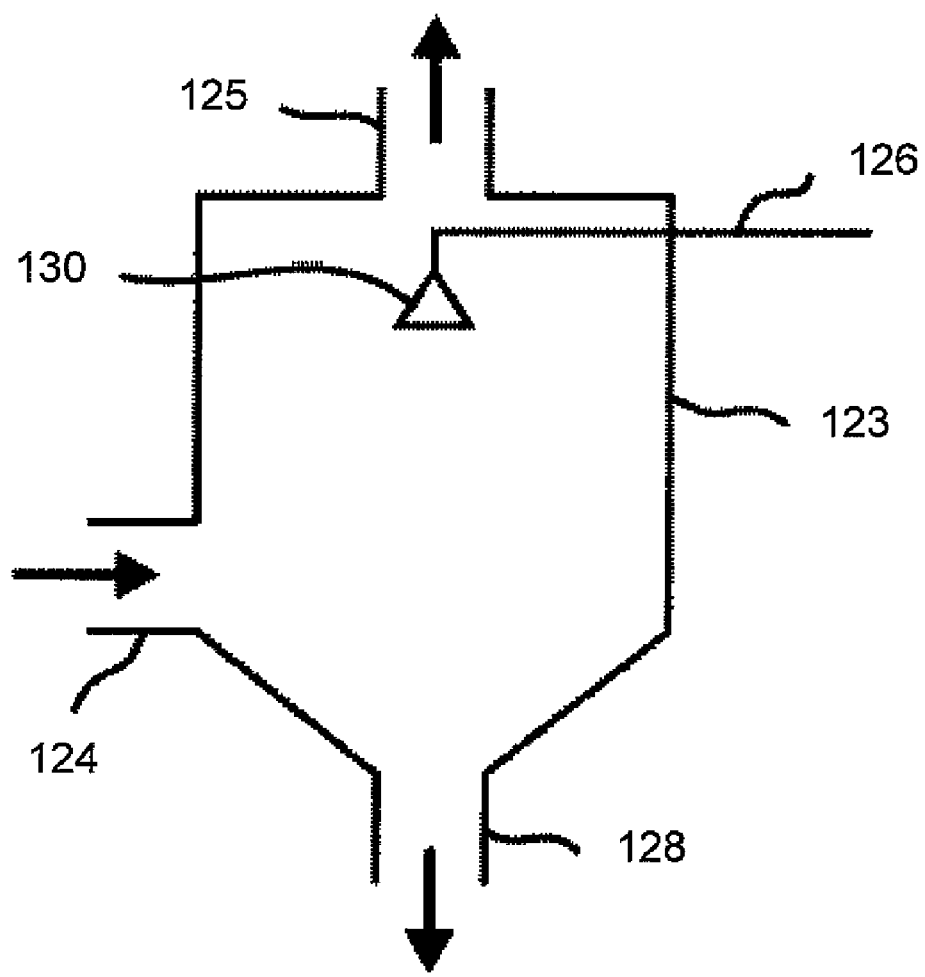
FIG. 3 shows a schematic diagram of a second configuration example of a wet condenser.
Figure 4:
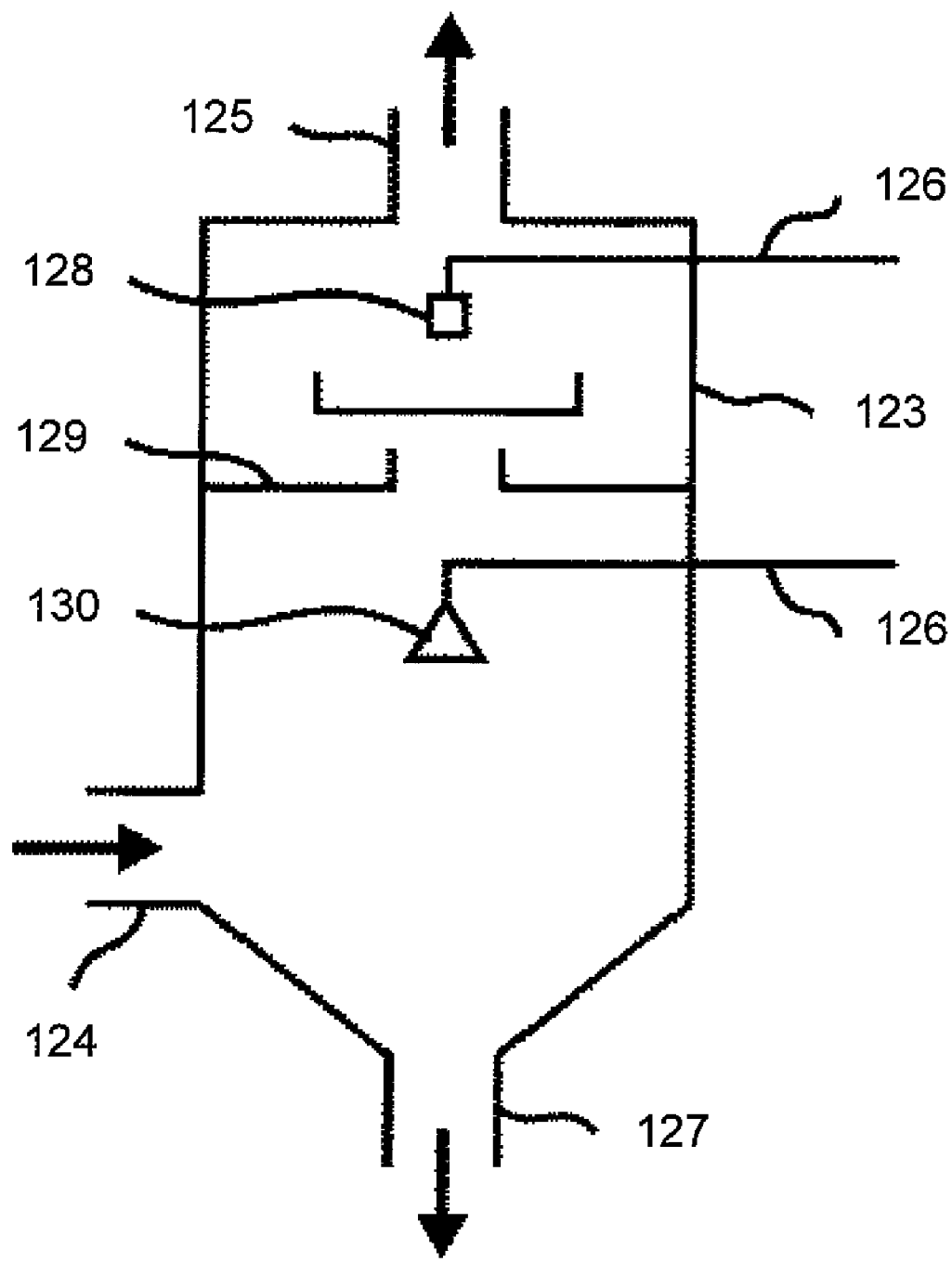
FIG. 4 shows a schematic diagram of a third configuration example of a wet condenser.

According to the present invention, any of the following wet condensers may be used: a tray-type wet condenser comprising a single tray or a plurality of trays, in which a cooling solution, which is lactic acid as a starting material, is circulated or poured from the top of the tray(s) for formation of a liquid film, and discharged vent gas is allowed to come into contact with the liquid film for dissolution/capturing of a dispersed in-process substance; a shower-type wet condenser in which a shower nozzle is provided to the upper portion thereof and a cooling solution, which is lactic acid as a starting material, is sprayed via the nozzle such that discharged vent gas is allowed to come into contact with liquid drops for dissolution/capturing of a dispersed in-process substance; a wet condenser obtained by combining a tray-type wet condenser and a shower-type wet condenser, in which the tray-type wet condenser is placed to serve as the upper portion thereof and the shower-type wet condenser is placed to serve as the lower portion thereof. FIG. 2 shows a schematic diagram of a tray-type wet condenser, FIG. 3 shows a schematic diagram of a shower-type wet condenser. FIG. 4 shows a schematic diagram of a wet condenser obtained by combining a tray-type wet condenser and a shower-type wet condenser. In the figures, numerical references 123, 124, 125, 126, 127, 128, 129, and 130 denote a wet condenser body, a gas inlet pipe, a non-condensable gas discharge pipe, a lactic acid feeding pipe, a condensed solution discharge pipe, a lactic acid feeding nozzle, a tray, and a lactic acid shower nozzle, respectively.

The vent gas discharged from the depolymerization apparatus 11 and the drying apparatus 21 contains water vapor. Therefore, an indirect heat exchanger for condensing/capturing water vapor may be installed in front of the corresponding wet condenser.

Hot wells 31, 35, 40, and 45 are separately installed in the lower portions of the individual wet condensers for introduction of drainage solutions discharged from the individual wet condensers. Such a drainage solution comprises a dispersed in-process substance that has been captured/dissolved and lactic acid serving as a refrigerant. A tank-type hot well can be used. However, the present invention is not limited thereto. In addition, a reflux cooler may be installed in the upper portion of a hot well such that lactic acid evaporated from a hot well is liquefied and refluxed to the hot well. Each hot well comprises at least an agitating means or a heating means for promotion of hydrolysis of a dispersed in-process substance contained in a drainage solution. Lactides and lactic acid oligomers contained in a dispersed in-process substance are hydrolyzed to lactic acid while consuming water contained in a drainage solution such that the thus obtained lactic acid is mixed with lactic acid used as a refrigerant. Accordingly, further concentrated lactic acid is obtained.

Lactic acid obtained from each hot well as described above is refluxed into a wet condenser via a cooler installed in the upper portion of the wet condenser for circulation. Accordingly, further concentrated lactic acid can be obtained. The concentration of lactic acid to be circulated is maintained at 98% or less and preferably 95% or less in order to reduce failures of circulation due to a viscosity increase. Highly concentrated lactic acid obtained by circulation can be reused as a starting material by reintroducing into the lactic acid concentration apparatus 3. However, highly concentrated lactic acid may be reintroduced into the lactic acid feeding apparatus 1 or the condensation apparatus 7. Also, highly concentrated lactic acid may be alternatively used as a starting material in another process using lactic acid. In addition, lactic acid obtained from a hot well may be directly reintroduced into the lactic acid feeding apparatus 1, the lactic acid concentration apparatus 3, or the condensation apparatus 7 without being circulated.

A wet condenser using lactic acid as a refrigerant is advantageous in that water contained in lactic acid is consumed via hydrolysis and in that generation of additional lactic acid through hydrolysis of a dispersed in-process substance results in concentration of lactic acid used for cooling, and the time required for the concentration step can be shortened with the reuse of the concentrated lactic acid. These advantageous points lead to the improvement of the synthesis efficiency throughout the entire process and suppression of operational cost. In addition, compared with a conventional wet condenser using water, the above condenser is advantageous in that a dispersed in-process substance is sufficiently hydrolyzed therein, causing no sludge generation in a solution and resulting in non-occurrence of clogging in pipes, etc. This is because a dispersed in-process substance comprising lactides, oligomers, and the like returns to lactic acid in a liquid form after being sufficiently hydrolyzed with water contained in lactic acid with the use of at least a heating means or an agitating means in a hot well located in the lower portion of a wet condenser. Further, a dispersed in-process substance is washed out with lactic acid so as not to invade an apparatus such as a vacuum pump installed downstream of a wet condenser and not to cause deterioration of such apparatus.

Figure 5:
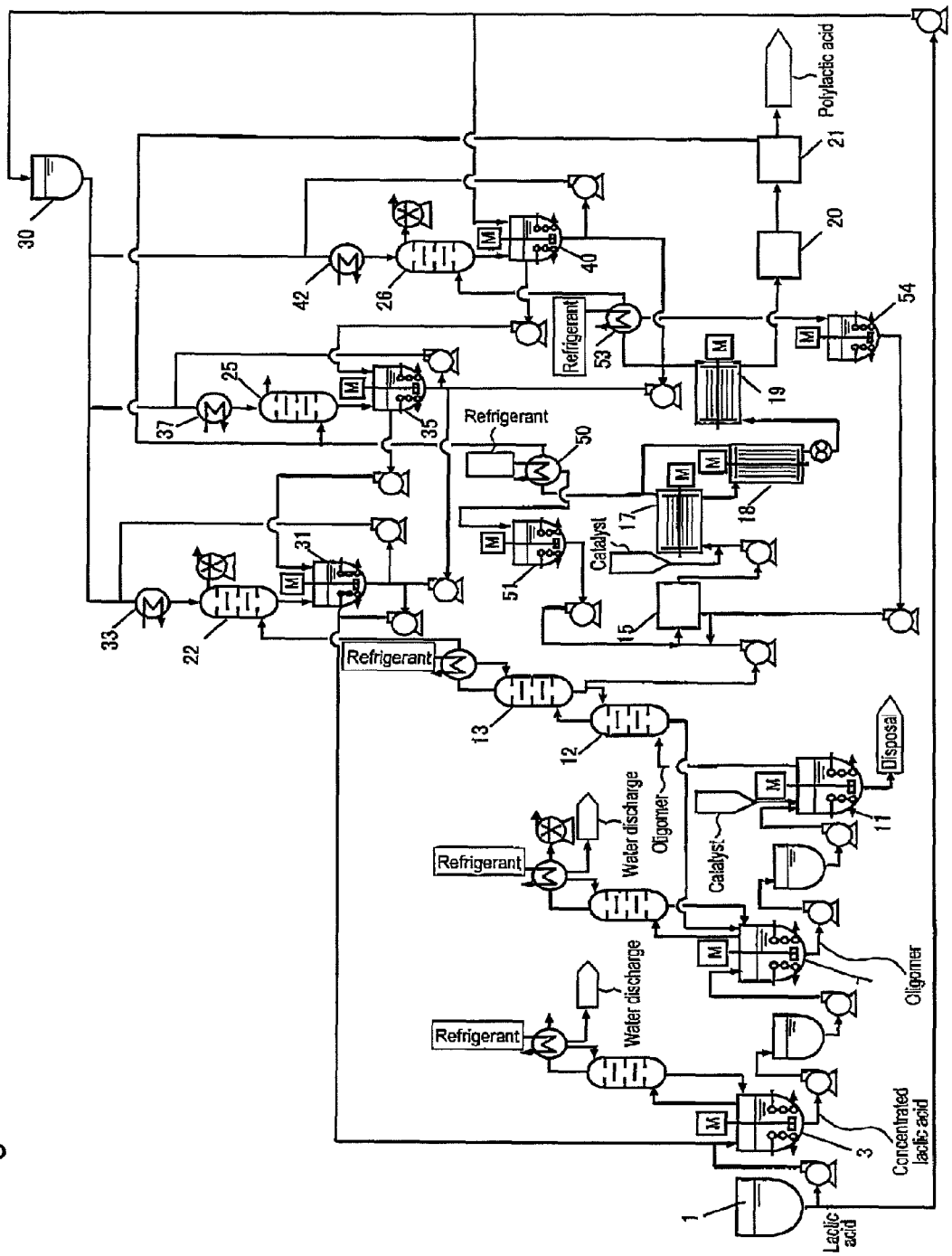
FIG. 5 shows a practical example of the equipment shown in FIG. 1.

FIG. 5 shows a practical example of the equipment shown in FIG. 1, which is different from the above example in that the vent gas discharged from ring-opening polymerization apparatuses 17 and 18 via an indirect heat exchanger 50 and the vent gas discharged from a drying apparatus 21 are mixed together and introduced into a wet condenser 25. As in such case, a wet condenser and a hot well may be installed not only to each of the vent gas discharge paths of a depolymerization apparatus 11, a drying apparatus 21 and individual indirect heat exchangers separately, but also along a single path connected to the vent gas discharge paths for two or more apparatuses.

EXAMPLES

Polylactide was synthesized using the equipment shown in FIG. 1. The yield based on starting material was 65%. In addition, table 1 shows reaction conditions for each apparatus.

TABLE 1

| Step | Temperature | Pressure | Reaction time |
|---|---|---|---|
| Concentration | 135° C. | Atmospheric pressure | 3 h |
| Condensation | 170° C. | 10 Torr or less | 10 h |
| Depolymerization | 200° C. | 10 Torr or less | 30 min |
| Ring-opening polymerization | 170° C. 190° C. | Atmospheric pressure Atmospheric pressure | 5 h 5 h |
| Liquid phase devolatilizing | 200° C. | 10 Torr or less | 3 h |
| Drying | 140° C. | Atmospheric pressure | 20 min |

COMPARATIVE EXAMPLE

Polylactide was synthesized using a polylactide synthesis equipment in which a conventional wet condenser using water alone was used for vent gas discharge paths of all apparatuses. The yield based on starting material was 60%.

All references, including any publications, patents or patent applications cited in this specification are hereby incorporated by reference in their entirely.

What is claimed is:

1. An equipment for producing polyhydroxycarboxylic acid, comprising a ring-opening polymerization apparatus for causing ring-opening polymerization of hydroxycarboxylic acid cyclic dimers, a liquid phase devolatilizing apparatus for devolatilizing of unreacted cyclic dimers or by-products with application of negative pressure while maintaining the generated polyhydroxycarboxylic acid in a melted state, and a drying apparatus for heating solidified polyhydroxycarboxylic acid for drying, wherein
   an indirect heat exchanger is connected to a vent gas discharge path of the liquid phase devolatilizing apparatus,
   the indirect heat exchanger captures a dispersed in-process substance containing the cyclic dimers and transfers the substance to the ring-opening polymerization apparatus,
   a wet condenser and a hot well are connected to a vent gas discharge path of the indirect heat exchanger and that of the drying apparatus, respectively,
   the wet condenser captures a dispersed in-process substance containing the cyclic dimers with the use of a refrigerant containing hydroxycarboxylic acid corresponding to the cyclic dimers at a concentration of 50% or more and transfers the substance to the hot well,
   the hot well causes hydrolysis of the cyclic dimers for generation of hydroxycarboxylic acid,
   the generated hydroxycarboxylic acid is mixed with the refrigerant and the mixture is circulated to the wet condenser, and
   hydroxycarboxylic acid is highly concentrated via circulation between the wet condenser and the hot well and then discharged.

2. The equipment for producing polyhydroxycarboxylic acid according to claim 1, wherein an indirect heat exchanger is connected to a vent gas discharge path of the ring-opening polymerization apparatus and a wet condenser and a hot well are connected to a vent gas discharge path of the indirect heat exchanger.

3. The equipment for producing polyhydroxycarboxylic acid according to claim 1, further comprising a condensation apparatus for oligomerizing hydroxycarboxylic acid and a depolymerization apparatus for depolymerizing oligomers to generate hydroxycarboxylic acid cyclic dimers, in upstream of the ring-opening polymerization apparatus, wherein highly concentrated hydroxycarboxylic acid obtained as the result of circulation between the wet condenser and the hot well is transferred to the condensation apparatus so as to be used as a starting material.

4. The equipment for producing polyhydroxycarboxylic acid according to claim 2, further comprising a condensation apparatus for oligomerizing hydroxycarboxylic acid and a depolymerization apparatus for depolymerizing oligomers to generate hydroxycarboxylic acid cyclic dimers in upstream of the ring-opening polymerization apparatus, wherein highly concentrated hydroxycarboxylic acid obtained as the result of circulation between the wet condenser and the hot well is transferred to the condensation apparatus so as to be used as a starting material.

5. The equipment for producing polyhydroxycarboxylic acid according to claim 3, wherein a wet condenser and a hot well are connected to a vent gas discharge path of the depolymerization apparatus.

6. The equipment for producing polyhydroxycarboxylic acid according to claim 4, wherein a wet condenser and a hot well are connected to a vent gas discharge path of the depolymerization apparatus.

7. The equipment for producing polyhydroxycarboxylic acid according to claim 1, further comprising a forming apparatus between the liquid phase devolatilizing apparatus and the drying apparatus for allowing polyhydroxycarboxylic acid to be water-cooled and then formed into a pellet shape.

8. The equipment for producing polyhydroxycarboxylic acid according to claim 1, further comprising a purification apparatus between the indirect heat exchanger and the ring-opening polymerization apparatus, wherein the purification apparatus purifies hydroxycarboxylic acid cyclic dimers from the dispersed in-process substance and transfers the resultant to the ring-opening polymerization apparatus.

9. The equipment for producing polyhydroxycarboxylic acid according to claim 1, wherein the dispersed in-process substance further contains hydroxycarboxylic acid oligomers and the hot well causes hydrolysis of the oligomers.

10. A method for producing polyhydroxycarboxylic acid comprising the steps of ring-opening polymerization of hydroxycarboxylic acid cyclic dimers, liquid phase devolatilizing for devolatilizing of unreacted cyclic dimers or by-products with application of negative pressure while maintaining the generated polyhydroxycarboxylic acid in a melted state, and drying by heating solidified polyhydroxycarboxylic acid for drying, wherein:
   a dispersed in-process substance containing the cyclic dimers is captured from a vent gas discharged in the liquid phase devolatilizing step with the use of an indirect heat exchanger such that the substance is used as a starting material in the ring-opening polymerization step, while the dispersed in-process substance containing the cyclic dimers is also captured from a vent gas discharged from the indirect heat exchanger and a vent gas discharged in the drying step with the use of a solution containing hydroxycarboxylic acid corresponding to the cyclic dimers at a concentration of 50% or more,
   the dispersed in-process substance captured with the use of the solution is hydrolyzed for generation of hydroxycarboxylic acid, the generated hydroxycarboxylic acid is mixed with the solution and the mixture is circulated, and highly concentrated hydroxycarboxylic acid obtained by circulating the solution is discharged.

11. The method for producing polyhydroxycarboxylic acid according to claim 10, wherein the dispersed in-process substance containing the cyclic dimers is captured from a vent gas discharged in the ring-opening polymerization step with the use of the indirect heat exchanger so as to be used as a starting material in the ring-opening polymerization step, during which the dispersed in-process substance containing the cyclic dimers is also captured from a vent gas discharged from the indirect heat exchanger with the use of the solution, the dispersed in-process substance captured with the use of the solution is hydrolyzed for generation of hydroxycarboxylic acid, the generated hydroxycarboxylic acid is mixed with the solution and the mixture is circulated, and highly concentrated hydroxycarboxylic acid obtained by circulating the solution is discharged.

12. The method for producing polyhydroxycarboxylic acid according to claim 10, further comprising condensation step of oligomerizing hydroxycarboxylic acid and oligomer depolymerization step of generating hydroxycarboxylic acid cyclic dimers prior to the ring-opening polymerization step, wherein the discharged highly concentrated hydroxycarboxylic acid is used as a starting material in the condensation step.

13. The method for producing polyhydroxycarboxylic acid according to claim 11 further comprising condensation step of oligomerizing hydroxycarboxylic acid and oligomer depolymerization step of generating hydroxycarboxylic acid cyclic dimers prior to the ring-opening polymerization step, wherein the discharged highly concentrated hydroxycarboxylic acid is used as a starting material in the condensation step.

14. The method for producing polyhydroxycarboxylic acid according to claim 12, wherein the dispersed in-process substance containing the cyclic dimers is captured from a vent gas discharged in the depolymerization step with the use of the solution, the dispersed in-process substance captured with the use of the solution is hydrolyzed for generation of hydroxycarboxylic acid, the generated hydroxycarboxylic acid is mixed with the solution and the mixture is circulated, highly concentrated hydroxycarboxylic acid obtained by circulating the solution is discharged, and the discharged highly concentrated hydroxycarboxylic acid is used as a starting material in the condensation step.

15. The method for producing polyhydroxycarboxylic acid according to claim 13, wherein the dispersed in-process substance containing the cyclic dimers is captured from a vent gas discharged in the depolymerization step with the use of the solution, the dispersed in-process substance captured with the use of the solution is hydrolyzed for generation of hydroxycarboxylic acid, the generated hydroxycarboxylic acid is mixed with the solution and the mixture is circulated, highly concentrated hydroxycarboxylic acid obtained by circulating the solution is discharged, and the discharged highly concentrated hydroxycarboxylic acid is used as a starting material in the condensation step.

16. The method for producing polyhydroxycarboxylic acid according to claim 10, further comprising a forming step of allowing polyhydroxycarboxylic acid to be water-cooled and then subjected to forming, between the liquid phase devolatilizing step and the step of drying solidified polyhydroxycarboxylic acid by heating.

17. The method for producing polyhydroxycarboxylic acid according to claim 10, wherein the dispersed in-process substance containing the cyclic dimers is captured with the use of the indirect heat exchanger, the cyclic dimers are purified, and the resultant is used as a starting material in the ring-opening polymerization step.

18. The method for producing polyhydroxycarboxylic acid according to claim 10, wherein the dispersed in-process substance further contains hydroxycarboxylic acid oligomers, and the oligomers are captured with the use of the solution and hydrolyzed for generation of hydroxycarboxylic acid.

* * * * *